(12) United States Patent
Wu et al.

(10) Patent No.: US 12,189,186 B2
(45) Date of Patent: Jan. 7, 2025

(54) OPTICAL ISOLATOR WITH OPTICAL FIBERS ARRANGED ON ONE SINGLE SIDE

(71) Applicant: II-VI Delaware, Inc., Wilmington, DE (US)

(72) Inventors: Yuping Wu, Fuzhou (CN); Peng Xiao, Fuzhou (CN); Danping Wei, Fuzhou (CN)

(73) Assignee: II-VI Delaware, Inc., Wilmington, DE (US)

( * ) Notice: Subject to any disclaimer, the term of this patent is extended or adjusted under 35 U.S.C. 154(b) by 13 days.

(21) Appl. No.: 17/933,431

(22) Filed: Sep. 19, 2022

(65) Prior Publication Data

US 2023/0013926 A1 Jan. 19, 2023

Related U.S. Application Data

(63) Continuation of application No. 17/248,218, filed on Jan. 14, 2021, now Pat. No. 11,480,735.

(30) Foreign Application Priority Data

Jan. 16, 2020 (CN) .......................... 202010046874.6

(51) Int. Cl.
*G02B 6/27* (2006.01)
*G02F 1/01* (2006.01)
*G02F 1/09* (2006.01)

(52) U.S. Cl.
CPC ......... *G02B 6/2746* (2013.01); *G02B 6/2706* (2013.01); *G02F 1/0136* (2013.01); *G02F 1/093* (2013.01)

(58) Field of Classification Search
CPC ... G02B 6/2746; G02B 6/2706; G02F 1/0136; G02F 1/093
See application file for complete search history.

(56) References Cited

U.S. PATENT DOCUMENTS

| 4,548,478 A | 10/1985 | Shirasaki |
| 4,712,880 A | 12/1987 | Shirasaki |
| (Continued) | | |

FOREIGN PATENT DOCUMENTS

| CN | 103576346 A | 2/2014 |
| CN | 205539576 U | 8/2016 |
| (Continued) | | |

OTHER PUBLICATIONS

Cheng, Yale, "JDS Uniphase, Optical Isolators, Circulators", Encyclopedia of Physical Science and Technology (Third Edition), https://doi.org/10.1016/B0-12-227 410-5/00527-5, 2003, pp. 381-394.

*Primary Examiner* — Peter Radkowski

(57) ABSTRACT

An optical isolator has optical fibers arranged on a single side. The optical isolator includes an input optical fiber, an output optical fiber, an input splitting/combining device, an output splitting/combining device, an input optical rotation device, an output optical rotation device, a lens, a Faraday rotator, and a reflector. The input optical fiber and the output optical fiber are on a same side of each of the lens, the Faraday rotator, and the reflector. The optical isolator with input and output optical fibers arranged on a single side only needs to use one lens. The input and output splitting/combining devices are fixed on an end surfaces of input/output optical fibers, respectively.

22 Claims, 8 Drawing Sheets

(56) References Cited

U.S. PATENT DOCUMENTS

| | | | | |
|---|---|---|---|---|
| 5,033,830 A | * | 7/1991 | Jameson | G02B 6/2746 359/489.08 |
| 5,471,340 A | | 11/1995 | Cheng et al. | |
| 5,499,132 A | * | 3/1996 | Tojo | G02B 6/272 385/11 |
| 5,581,640 A | * | 12/1996 | Pan | G02F 1/093 385/11 |
| 5,689,360 A | | 11/1997 | Kurata et al. | |
| 5,768,005 A | | 6/1998 | Cheng et al. | |
| 5,878,176 A | | 3/1999 | Cheng | |
| 6,014,244 A | | 1/2000 | Chang | |
| 6,097,869 A | | 8/2000 | Chang et al. | |
| 6,154,581 A | | 11/2000 | Lu et al. | |
| 6,195,479 B1 | * | 2/2001 | Pan | G02F 1/31 359/484.08 |
| 6,212,305 B1 | * | 4/2001 | Pan | G02B 6/2746 385/11 |
| 6,246,518 B1 | | 6/2001 | Chang et al. | |
| 6,249,619 B1 | | 6/2001 | Bergmann et al. | |
| 6,275,637 B1 | | 8/2001 | Chang et al. | |
| 6,360,034 B1 | | 3/2002 | Chang | |
| 6,480,331 B1 | * | 11/2002 | Cao | G02F 1/093 359/489.05 |
| 6,549,686 B2 | | 4/2003 | Huang et al. | |
| 6,580,558 B2 | | 6/2003 | Zhu et al. | |
| 6,587,266 B2 | | 7/2003 | Tai et al. | |
| 6,657,785 B2 | | 12/2003 | Ducellier et al. | |
| 6,697,198 B2 | | 2/2004 | Tai et al. | |
| 7,058,304 B2 | | 6/2006 | Tai et al. | |
| 7,072,111 B2 | | 7/2006 | Iwatsuka | |
| 7,352,928 B2 | * | 4/2008 | Chen | G02B 6/29395 385/24 |
| 7,433,557 B2 | * | 10/2008 | Chen | G02B 6/29395 385/47 |
| 7,446,847 B2 | * | 11/2008 | Konno | G02B 6/2746 349/193 |
| 7,813,040 B2 | * | 10/2010 | Colbourne | G02F 1/093 385/11 |
| 9,557,586 B2 | * | 1/2017 | Hosokawa | B23K 26/38 |
| 9,654,848 B2 | | 5/2017 | Frisken | |
| 10,048,520 B2 | * | 8/2018 | Kim | G02B 6/2746 |
| 10,461,878 B2 | | 10/2019 | Frisken | |
| 10,509,182 B2 | * | 12/2019 | Wigley | G02B 6/421 |
| 2001/0053022 A1 | | 12/2001 | Tai et al. | |
| 2002/0024730 A1 | | 2/2002 | Ducellier et al. | |
| 2002/0027711 A1 | | 3/2002 | Tai et al. | |
| 2002/0076144 A1 | | 6/2002 | Tai et al. | |
| 2002/0110305 A1 | | 8/2002 | Huang et al. | |
| 2002/0159149 A1 | | 10/2002 | Zhu et al. | |
| 2002/0181100 A1 | * | 12/2002 | Cao | G02B 5/3083 359/489.08 |
| 2004/0100693 A1 | * | 5/2004 | Cao | G02F 1/093 359/489.08 |
| 2005/0111102 A1 | | 5/2005 | Iwatsuka | |
| 2007/0177264 A1 | * | 8/2007 | Konno | G02B 6/2746 359/489.08 |
| 2007/0230867 A1 | * | 10/2007 | Chen | G02B 6/29383 385/24 |
| 2007/0291358 A1 | * | 12/2007 | Colbourne | G02F 1/093 359/484.04 |
| 2008/0106814 A1 | * | 5/2008 | Chen | G02B 6/2713 359/857 |
| 2014/0300962 A1 | * | 10/2014 | Hosokawa | B23K 26/064 359/484.03 |
| 2015/0208143 A1 | | 7/2015 | Frisken | |
| 2016/0187675 A1 | * | 6/2016 | Kim | G02B 5/22 359/484.04 |
| 2017/0214482 A1 | | 7/2017 | Frisken | |
| 2019/0004262 A1 | * | 1/2019 | Wigley | G02B 6/0006 |
| 2020/0064569 A1 | * | 2/2020 | Wigley | G02B 6/4213 |
| 2021/0223477 A1 | | 7/2021 | Wu et al. | |
| 2021/0294037 A1 | | 9/2021 | Wu et al. | |

FOREIGN PATENT DOCUMENTS

| | | |
|---|---|---|
| CN | 110147001 A | 8/2019 |
| CN | 211348710 U | 8/2020 |
| KR | 20040051290 A | 6/2004 |

* cited by examiner

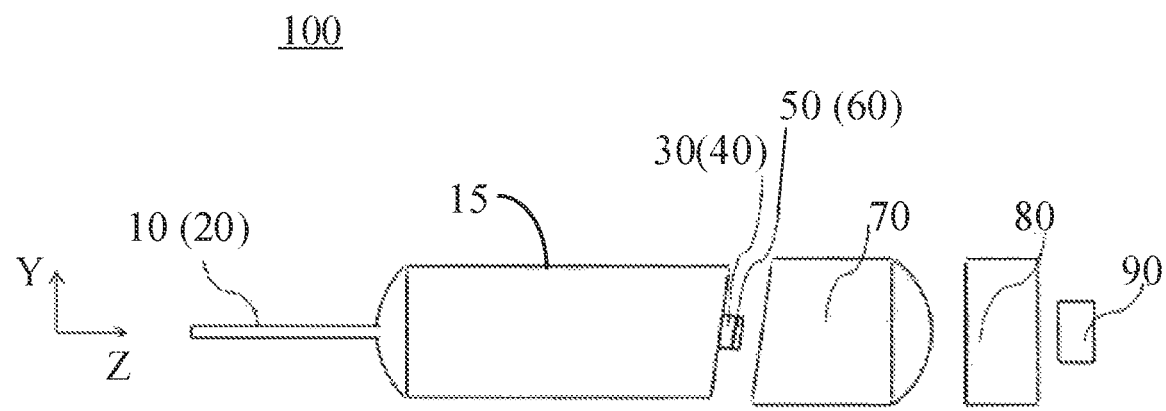
FIG. 3
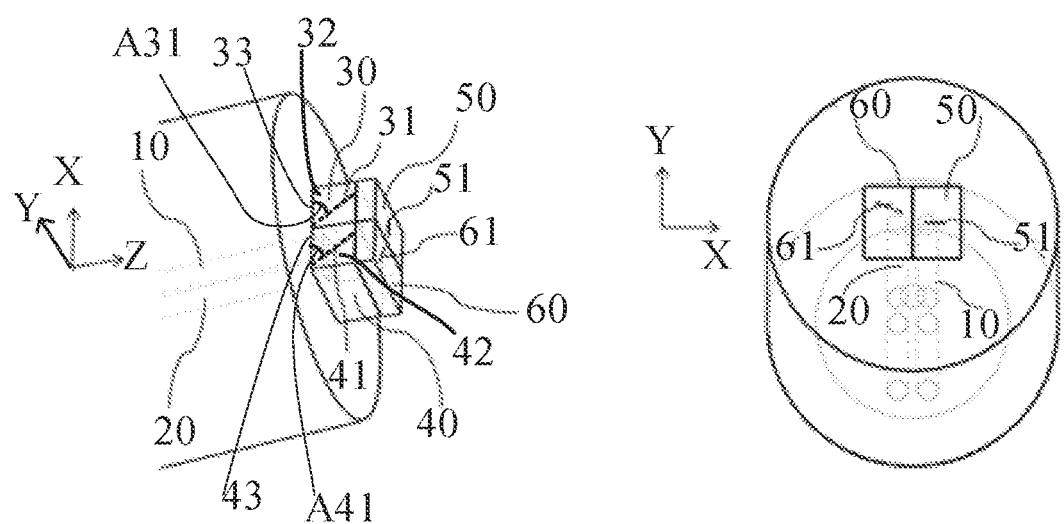
FIG. 4A
FIG. 4B

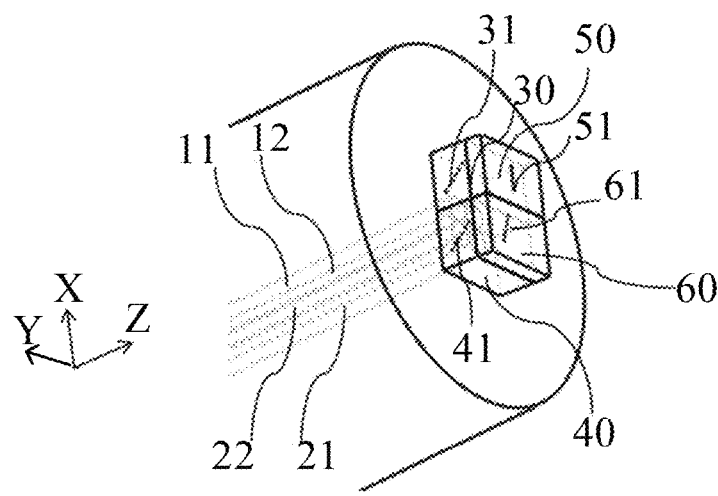 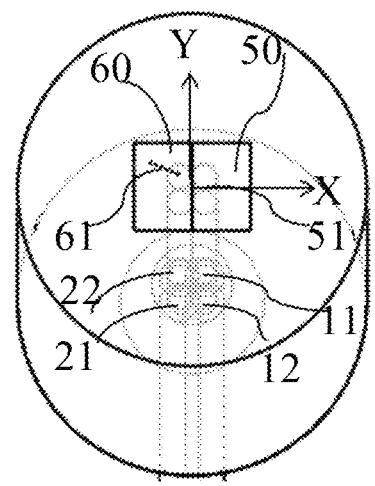
FIG. 11A          FIG. 11B
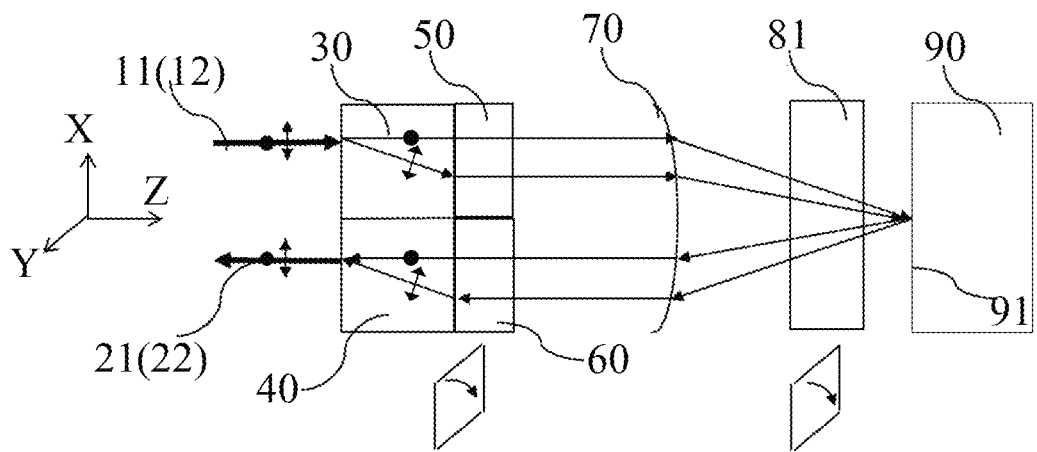
FIG. 12

OPTICAL ISOLATOR WITH OPTICAL FIBERS ARRANGED ON ONE SINGLE SIDE

CROSS-REFERENCE TO RELATED APPLICATIONS

This is a continuation of U.S. patent application Ser. No. 17/248,218, filed Jan. 14, 2021, which claims priority to Chinese Patent Application No. 202010046874.6 filed on Jan. 16, 2020, the contents of which are relied upon and incorporated herein by reference in their entireties.

TECHNICAL FIELD

The disclosure relates generally to passive optical devices used in the field of optical fiber communications, in particular to an optical isolator with optical fibers arranged on one single side.

BACKGROUND

In an optical fiber communication system, reverse light from end surfaces of optical fibers and nodes can exists to various degrees on a transmission line or path. Such reverse light affects the normal output of a laser and causes, for example, fluctuating intensity, frequency drift, decreased modulation bandwidth, and increased noise. These may disrupt normal operations of the laser. Meanwhile, such reverse light may also cause the transmission performance of the system to deteriorate, may cause an optical amplifier to undergo gain change and generate auto-excitation, and may further result in error code.

An optical isolator is a non-reciprocal device that only allows one-way transmission of light. An optical isolator can suppress the transmission of reverse light, can reduce the damage caused by reverse light to a laser, can maintain the operating stability of the laser, and can extend the service life of the laser. Therefore, as an important passive optical device, optical isolators are broadly used in high-speed and large-capacity optical fiber communication systems.

With the technical development in the entire communication industry, it will continue to be an important trend of the technical development to miniaturize and lower the cost of passive optical devices, which is not only a demand by the technical development of the industry, but also an urgent demand from the market. Mainstream optical isolators currently on the market are a type of device that has optical fibers arranged on two sides and that adopts a dual-collimator structure. Accordingly, the overall size is affected by the size of collimators. The required assembly space is large, and material costs are high. Further, as the input and output optical fibers are located on two sides of the device, the optical fibers on two sides need to be organized separately when the device is used on or as a module for cascade connection with other devices. Accordingly, the process is relatively complex.

SUMMARY

The present disclosure is directed to an optical isolator with optical fibers arranged on one single side, so as to have a small structural size, low cost, and simple assembly process.

In one aspect, an optical isolator may include optical fibers arranged on a single side. The optical isolator may include an input optical fiber, an output optical fiber, an input splitting/combining device, an output splitting/combining device, an input optical rotation device, an output optical rotation device, a lens, a Faraday rotator, and a reflector that are sequentially arranged. The Faraday rotator includes a magneto-optical crystal and a magnetic field device. End surfaces of the input optical fiber and the output optical fiber close to the lens are located in the same plane. The input splitting/combining device and the input optical rotation device correspond to the input optical fiber and are sequentially fixed on the end surface of the input optical fiber and being close to the lens. That is, the input splitting/combining device is fixed on the input optical fiber, and the input optical rotation device is fixed on the input splitting/combining device. The output splitting/combining device and the output optical rotation device correspond to the output optical fiber and are sequentially fixed on the end surface of the output optical fiber and being close to the lens. That is, the output splitting/combining device is fixed on the output optical fiber, and the output optical rotation device is fixed on the output splitting/combining device. There are two focal planes on two outer sides of the lens. Transmission end surfaces of the input optical fiber and the output optical fiber are located on a first focal plane of the lens, and the reflecting face of the reflector is located on a second focal plane of the lens. The Faraday rotator is located between the lens and the reflector.

In some examples, when an incident beam is inputted from the input optical fiber, the beam passes the input splitting/combining device to be split, further enters the input optical rotation device for optical rotation, subsequently irradiates into the lens to form a collimated beam, passes through the Faraday rotator for optical rotation, irradiates into the reflector and is reflected, returns to the Faraday rotator for optical rotation, further irradiates into the output optical rotation device for optical rotation, further enters the output splitting/combining device to be combined, and enters the output optical fiber to be output.

In certain examples, an incident beam is inputted from the output optical fiber, the beam passes the output splitting/combining device to be split, further enters the output optical rotation device for optical rotation, subsequently irradiates into the lens to form a collimated beam, passes through the Faraday rotator for optical rotation, irradiates into the reflector and is reflected, returns to the Faraday rotator for optical rotation, further irradiates into the input optical rotation device for optical rotation, further enters the input splitting/combining device and cannot be combined, and output isolation on the input optical fiber is performed.

As an example implementation, furthermore, the number of the input optical fibers is equal to the number of the output optical fibers and is 2N, where N is an integer greater than 1. The input optical fibers and the output optical fibers are combined into a porous optical fiber head or an optical fiber array, and the input optical fibers and the output optical fibers are arranged and combined into a structure that is symmetric with respect to a center.

In some examples, the input splitting/combining device and the output splitting/combining device include a displacement-type birefringent crystal and are used for splitting/combining the o light and the e light inside the crystal. An optical axis of the birefringent crystal intersects obliquely with a surface of the crystal. A splitting direction of the o light and the e light is perpendicular to the beam propagation direction and is parallel to the direction of relative displacement between the input optical fiber and the output optical fiber.

In some examples, the angle between optical axes of the birefringent crystal and incident wavevector is around 45 degrees, and the splitting distance between the o light and the e light is increased, e.g., to a maximum value, when the crystal has a consistent thickness.

In certain examples, the optical axes of the input splitting/combining device and the output splitting/combining device have the same direction or are perpendicular to each other; and the input splitting/combining device and the output splitting/combining device may be a plurality of independent devices or may be integrally formed into the same device.

In another example, the input optical rotation device and the output optical rotation device include a ½ wavelength ($\lambda$) phase delay-type crystalline quartz waveplate used for rotating a polarization direction of a linear polarized light; and the optical axes of the input optical rotation device and the output optical rotation device intersect obliquely with a surface of the crystals. A combination of the input optical rotation device and the output optical rotation device performs a total rotation angle of 45 degrees for the polarization direction of the linear polarized light.

In yet another example, the optical rotation angle of the input optical rotation device is 0 degree, and the optical rotation angle of the output optical rotation device is 45 degrees; or, the optical rotation angle of the input optical rotation device is 45 degrees, and the optical rotation angle of the output optical rotation device is 0 degree.

In some example, the rotation angle of the optical rotation devices is 45 degrees, and the angle between the optical axes thereof and an edge of a crystal surface is 67.5 degrees or 22.5 degrees. In certain examples, the rotation angle of the optical rotation devices is 0 degree, and the angle between the optical axes thereof and an edge of a crystal surface is 0 degree or 90 degrees.

In another example, the lens is a C lens or other lens having focal planes on two sides used for focalizing and collimating light beams.

In yet another example, the Faraday rotator is used for rotating a polarization direction of a linear polarized light, and the rotation angle thereof is 22.5 degrees.

In some examples, the Faraday rotator may be a combination of a magneto-optical crystal and a magnetic field device or may also be an independent magneto-optical crystal.

In certain examples, the magnetic field device is a permanent magnet, such as a magnetic ring or parallel plates made of a magnetic material used for providing a saturated magnetic field strength for the magneto-optical crystal, causing the magneto-optical crystal to perform fixed rotation of the polarization direction of the linear polarized light. The magnetic field direction may be parallel to the light propagation direction.

In another examples, when the linear polarized light incomes from an N pole of the magnetic field, the polarization direction is rotated clockwise viewing along a direction opposite the light propagation direction; and when the linear polarized light incomes from the S pole of the magnetic field, the polarization direction is rotated counterclockwise viewing along a direction opposite the light propagation direction.

In yet another example, when the optical axes of the input splitting/combining device and the output splitting/combining device have the same direction, the input optical rotation device, the output optical rotation device, and the Faraday rotator are combined to perform a total rotation angle of 90 degrees for a linear polarized light during forward input and a total rotation angle of 0 degree for the linear polarized light during backward input. In some examples, when the optical axes of the input splitting/combining device and the output splitting/combining device perpendicular to each other, the input optical rotation device, the output optical rotation device, and the Faraday rotator are combined to perform a total rotation angle of 0 degree for the linear polarized light during forward input and a total rotation angle of 90 degrees for the linear polarized light during backward input.

In some examples, the reflector is a glass sheet having a certain thickness, and the reflection surface thereof is coated with a highly reflective film.

By adopting the above-described technical solutions, the present disclosure uses a reflector to turn the light, such that the device needs to use only one collimator, which, as compared with existing isolators, eliminates one collimator, reduces the device volume by half, reduces the space required for assembly inside the module by half, and accordingly lowers the material cost. Further, the input and the output of the present solution are on the same side of the device, and single-side fiber organizing may be performed at the same time as the assembly inside the module, which simplifies the process of fiber organizing and assembly. Further, by fixing the splitting/combining devices on end surfaces of the input/output optical fibers, control of input/output and function scalability may be improved. Further, the required volume of splitting/combining devices may be reduced, leading to a more compact structure and lower material cost.

BRIEF DESCRIPTION OF THE DRAWINGS

The present disclosure will be further described in detail below with reference to embodiments and accompanying drawings in which:

FIG. 3 is another side view on an Y-Z plane of the optical isolator of FIG. 1 having the optical fibers arranged on the single side according to various embodiments of the present disclosure;

FIGS. 4A and 4B are schematic diagrams of an assembled structure of splitting/combining devices and optical rotation devices of the optical isolator of FIG. 1 according to various embodiments of the present disclosure;

FIGS. 11A and 11B are schematic diagrams of an assembled structure of splitting/combining devices and optical rotation devices of the optical isolator of FIG. 9 according to various embodiments of the present disclosure;

FIG. 12 illustrates an X-Z plane schematic diagram of the optical isolator of FIG. 9 showing an example forward light path according to various embodiments of the present disclosure;

DETAILED DESCRIPTION

Figure 1:
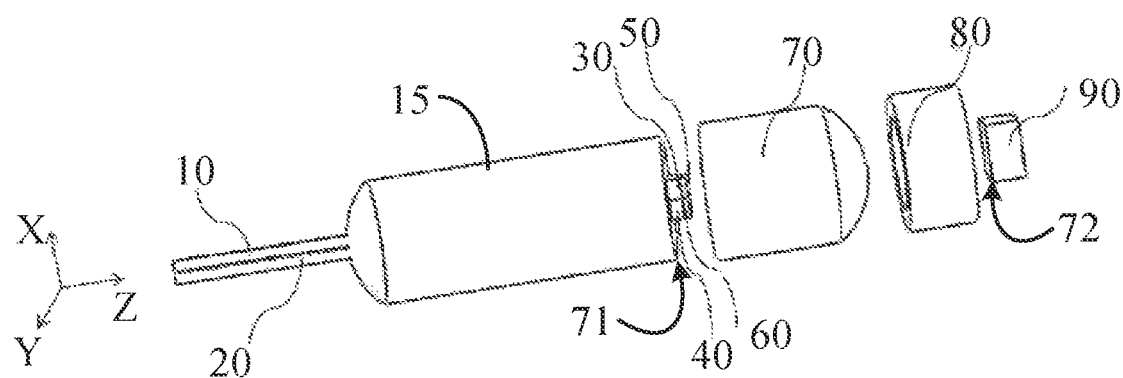
FIG. 1 is a perspective view of an optical isolator having optical fibers arranged on a single side according to various embodiments of the present disclosure.
Figure 2:
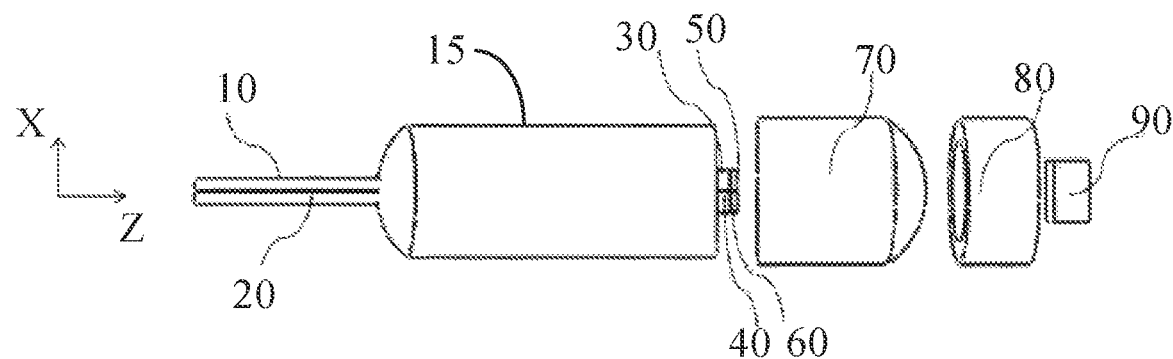
FIG. 2 is a side view on an X-Z plane of the optical isolator of FIG. 1 having the optical fibers arranged on the single side according to various embodiments of the present disclosure.

As shown in FIGS. 1 to 3, an optical isolator 100 of the present disclosure includes an input 10, an output 20, an input splitting/combining (e.g., birefringent) device 30, an output splitting/combining (e.g., birefringent) device 40, an input optical rotation device 50, an output optical rotation device 60, a lens 70, an intermediate rotation device (e.g., Faraday rotator) 80, and a reflector 90 that are sequentially arranged.

As shown in FIGS. 1 to 3, the input 10 and output 20 can include an input optical fiber 10 and an output optical fiber, and the input optical fiber 10 and the output optical fiber 20 can be combined into a dual optical fiber head (DOFH) 15. The input optical fiber 10 and the output optical fiber 20 are symmetrically distributed with respect to an axis of the DOFH 15 along X-direction; and have the same position in the Y direction. The number of the input optical fiber 10 may be one, and the number of the output optical fiber 20 may be one, so as to perform the function of one in and one out for the isolator 100.

Other arrangements can be used. For example, one or more input optical fibers (e.g., 10) and one or more output optical fibers (e.g., 20) may be combined in a porous optical fiber head or an optical fiber array for positioning the optical fibers, or may be positioned using any other suitable structures. An optical fiber head may include, for example, optical fibers and a glass structures for positioning the optical fibers.

The input splitting/combining device (e.g., 30) and the output splitting/combining device (e.g., 40) may be independent devices or may be integrally formed into the same device. The input optical rotation device (e.g., 50) and the output optical rotation device (e.g., 60) may be independent devices or may be integrally formed into the same device.

End surfaces of the input optical fiber 10 and the output optical fiber 20 are located in the same plane. The input splitting/combining device 30 is fixed on the input optical fiber 10, and the input optical rotation device 50 is fixed on the input splitting/combining device 30. The lens 70 has two focal planes on outer sides of the lens 70. The end surfaces of the input optical fiber 10 and the output optical fiber 20 are located on a first focal plane 71 of the lens 70, and the reflecting face of the reflector 90 is located on a second focal plane 72 of the lens 70. The Faraday rotator 80 is located between the lens 70 and the reflector 90. The output splitting/combining device 40 is fixed on the output optical fiber 20. The output optical rotation device 60 is fixed on the output splitting/combining device 40.

As shown in FIGS. 4A and 4B, in some embodiments, the input splitting/combining device 30 and the output splitting/combining device 40 may include, for example, Yttrium Vanadate ($YVO_4$) crystals, which are displacement-type birefringent crystal and used for splitting/combining the o-light (i.e., ordinary ray) and the e-light (i.e., extraordinary ray) inside the crystal. As expected, the o-light behaves according to Snell's law while the e-light does not. The input splitting/combining device 30 and the output splitting/combining device 40 may be mutually independent; and may be used for splitting or combining the o light (e.g., ordinary light) and the e light (e.g., extraordinary light) inside the crystals, e.g., splitting the o-light from the e light or combining the o light (e.g., ordinary light) and the e light. In some examples, an optical axis 31 of the input splitting/combining device 30 and an optical axis 41 of the output splitting/combining device 40 have the same direction.

In general, the optical axis (31, 41) may intersect obliquely with an edge (33, 43) of a surface (32, 42) of the crystal (30, 40) at an angle of 45 degrees. For example, the optical axis 31 may be in or parallel to the surface 32 of the crystal 30, and an angle A31 between the optical axis 31 and the edge 33 (e.g., along +X direction) of the surface 32 of the crystal 30 may be 45 degrees; and the optical axis 41 may be in or parallel to the surface 42 of the crystal 40, an angle A41 between the optical axis 41 and the edge 43 (e.g., along +X direction) of the surface 42 of the crystal 40 may be 45 degrees. The splitting direction of the o light and the e light is perpendicular to the beam propagation direction (the Z direction) and is parallel to a direction of relative displacement (the X direction) between the input optical fiber 10 and the output optical fiber 20. That is, the splitting direction of the o light and the e light is along the X direction.

As shown in FIGS. 4A and 4B, in some embodiments, the input optical rotation device 50 and the output optical rotation device 60 may include a half-wave plate used for rotating a polarization direction of a linear polarized light. For example, the optical rotation devices 50, 60 can be a type of ½ wavelength ($\lambda$) phase delay-type crystalline quartz waveplates used for rotating a polarization direction of a linear polarized light. An angle between the optical axis 51 of the input optical rotation device 50 and the X axis is 0 degree, and the rotation angle of a linear polarized light in the X-Y plane is 0 degree in polarization directions, such as the X direction, the Y direction, and the 45-degree direction. The angle between the optical axis 61 of the output optical rotation device 60 and the X axis is 22.5 degrees, and the rotation angle of a linear polarized light in the X-Y plane is 45 degrees in polarization directions, such as the X direction, the Y direction, and the 45-degree direction.

In the examples of FIGS. 1 to 3, the lens 70 may be a C-lens, and may have two focal planes, e.g., front and back focal planes 71, 72. As is typical and as shown in FIG. 3, the C-lens 70 includes an oblique end surface.

Figure 5:
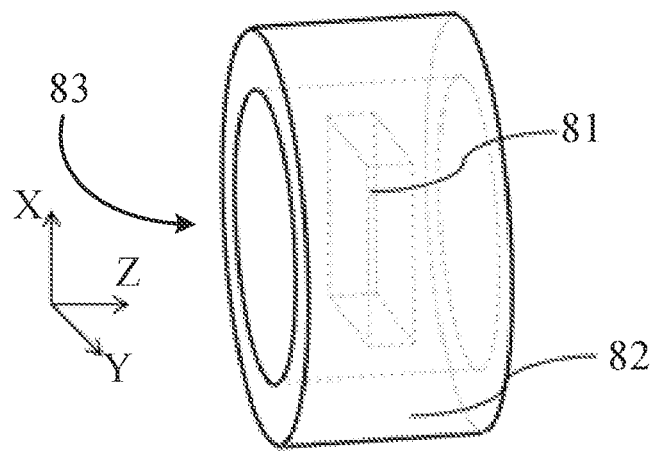
FIG. 5 is a schematic structural diagram of an example Faraday rotator according to various embodiments of the present disclosure.

As shown in FIG. 5, in some embodiments, the Faraday rotator 80 includes a magneto-optical crystal 81 and a magnetic field device 82. The magnetic field device 82 may be, for example, a hollow magnetic ring used for providing a saturated magnetic field strength for the magneto-optical crystal 82, causing the magneto-optical crystal 82 to perform a rotation of the polarization direction of the linear polarized light in the X-Y plane with the rotation angle at 22.5 degrees. The magnetic field direction is parallel to the light propagation direction. That is, the magnetic field direction is in the Z direction. When the linear polarized light incomes from the N pole 83 of the magnetic field, the polarization direction may be rotated clockwise, e.g., viewing along −Z direction.

Figure 6:
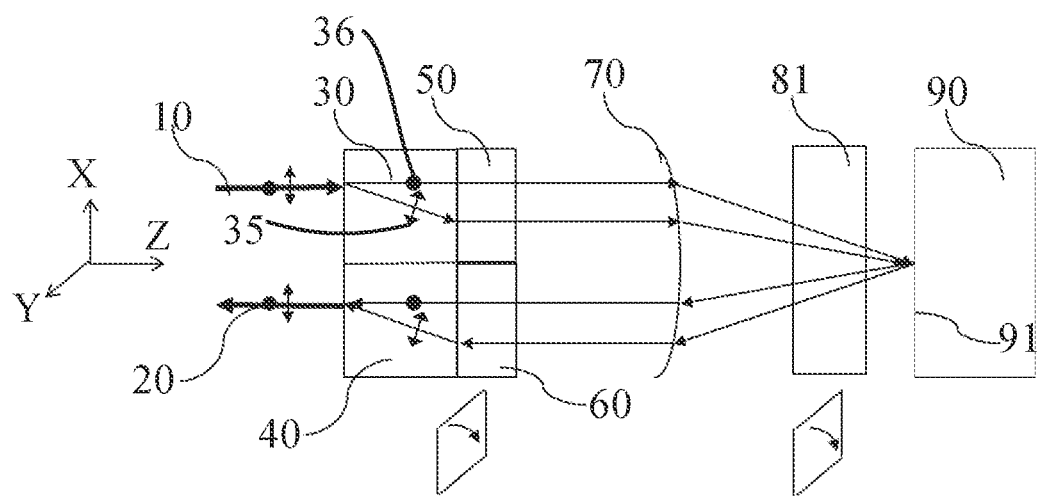
FIG. 6 illustrates an X-Z plane schematic diagram of the optical isolator of FIG. 1 showing an example forward light path according to various embodiments of the present disclosure.

As shown in FIG. 6, the isolator 100 allows incident light of an optical beam in a forward light path at the input 10 to pass for output at the output 20. The forward light path in the X-Z plane in this embodiment is as follows. An incident light beam is input from the input optical fiber 10 (x=x0, z=z0) along the Z direction. The light beam passes the input splitting/combining device 30, which splits the o light and the e light (i.e., displaces the e-light relative to the o-light) in the crystal of the input splitting/combining device 30. That is, one incident beam is split into two linear polarized light beams, having a first linear polarized light beam, e light, polarized in a direction in X-Z plane and indicated by a double-headed arrow 35, and a second linear polarized light beam, o light, polarized in the Y direction indicated by a dot 36. The beams enter the input optical rotation device 50, and the polarization directions of the two linear polarized light beams are rotated clockwise by 0 degree, i.e., being not rotated by the input optical rotation device 50, e.g., viewing along −Z direction.

From the rotation device 50, the polarized beams enter the lens 70, where beam collimation and focusing are performed. As the polarized beams pass the magneto-optical crystal 81 in the Faraday rotator 80, the polarization directions of the two linear polarized light beams are then rotated clockwise by an amount of 22.5 degrees, e.g., viewing along −Z direction. Passing from the rotator 80, the polarized beams are focused onto the reflection surface 91 of the reflector 90.

At the reflector 90, the polarized beams are reflected by the reflection surface 91 and return to or reach the magneto-optical crystal 81 in the Faraday rotator 80, and, accordingly, the polarization directions of the two linear polarized light beams are again rotated clockwise by the same amount of 22.5 degrees, e.g., viewing along −Z direction. Passing from the rotator 80, the polarized beams enter the output optical rotation device 60, and the polarization directions of the two linear polarized light beams are rotated clockwise by 45 degrees, e.g., viewing along −Z direction. At this point, the total rotation angle of each of the two linear polarized light beams is 90 degrees. Therefore, the beams can be combined by further entering the output splitting/combining device 40 so that the combined beam enters the output optical fiber 20 (x=−x0, z=z0) for outputting.

Figure 7:
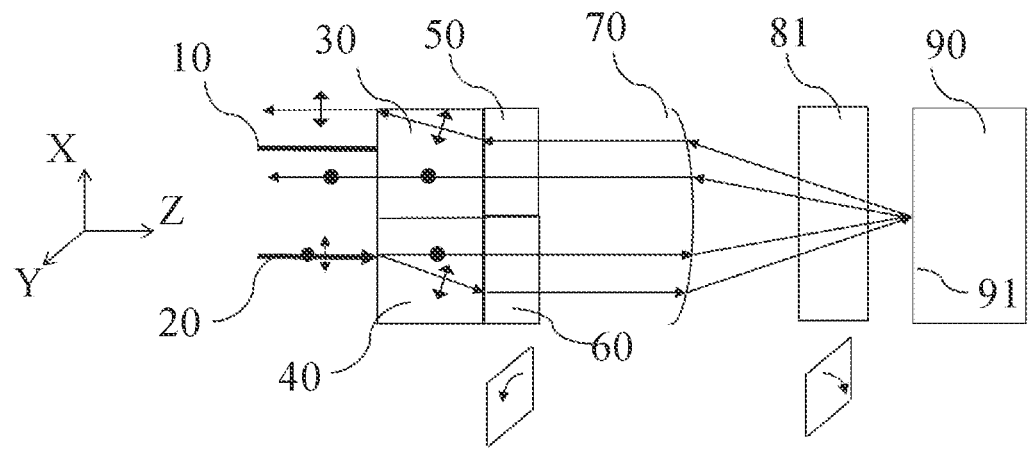
FIG. 7 illustrates an X-Z plane schematic diagram of the optical isolator of FIG. 1 showing an example backward light path according to various embodiments of the present disclosure.

In contrast to the forward light path of FIG. 6, the isolator 100 as shown in FIG. 7 isolates incident light of an optical beam at the output 20 from being output in a backward light path to the input 10. The backward isolation light path in the X-Z plane in this embodiment is as follows. An incident light beam input from the output optical fiber 20 (x=−x0, z=z0) along the Z direction can passes to the output splitting/combining device 40, which splits the o light and the e light in the crystal of the output splitting/combining device 40. That is, one incident beam is split into two linear polarized light beams, having a first linear polarized light beam polarized in a direction in X-Z plane and indicated by a double-headed arrow and a second linear polarized light beam polarized in the Y direction indicated by a dot, in the crystal of the output splitting/combining device 40.

From the splitting/combining device 40, the polarized beams enter the output optical rotation device 60, and the polarization directions of the two linear polarized light beams are rotated counterclockwise by 45 degrees, e.g., viewing along −Z direction. From the rotating device 60, the polarized beams enter the lens 70, where beam collimation and focusing are performed. As the polarized beams pass the magneto-optical crystal 81 in the Faraday rotator 80, the polarization directions of the two linear polarized light beams are rotated clockwise by an amount of 22.5 degrees, e.g., viewing along −Z direction. The beams are focused onto the reflection surface 91 of the reflector 90.

At the reflector 90, the polarized beams are reflected by the reflection surface 91 and return to the magneto-optical crystal 81 in the Faraday rotator 80, and, accordingly, the polarization directions of the two linear polarized light beams are again rotated clockwise by the amount of 22.5 degrees, e.g., viewing along −Z direction. From the lens 70, the polarized beams enter the input optical rotation device 50, and the polarization directions of the two linear polarized light beams are rotated clockwise by 0 degree, i.e., not being rotated by the input optical rotation device 50, e.g., viewing along −Z direction. At this point, the total rotation angle of the two linear polarized light beams is 0 degree. Therefore, the beams are not combined after further entering the input splitting/combining device 30. Instead, the input splitting/combining device 30 further displaces the e-light relative to the o-light. Accordingly, the input optical fiber 10 (x=x0, z=z0) has no light beam to output.

Figure 8:
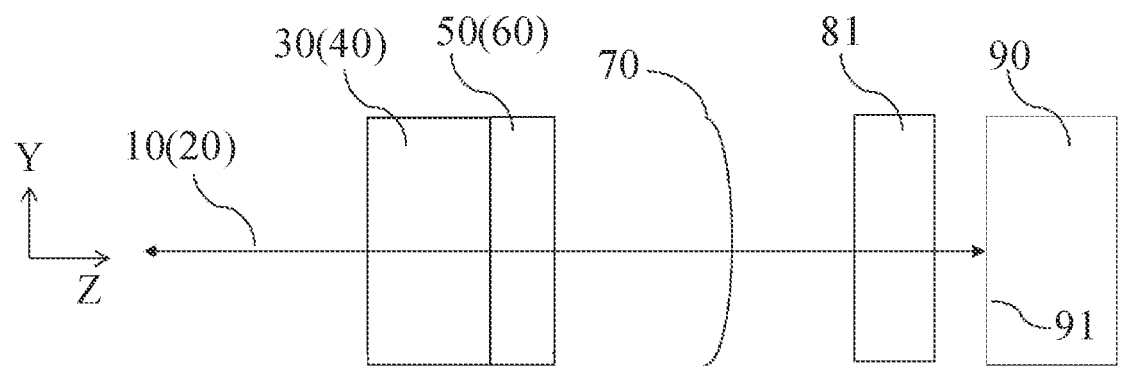
FIG. 8 illustrates an Y-Z plane schematic diagram of the optical isolator of FIG. 1 showing an example light path according to various embodiments of the present disclosure.

In the example of FIG. 8, no beam splitting or combining is performed in the Y-Z plane. The input optical fiber 10 and the output optical fiber 20 are located at the same y position. The light incoming from the input optical fiber 10 (y=y0, z=z0) is not displaced in the Y-Z plane in its return, to the output optical fiber 20 (y=y0, z=z0) for outputting.

In examples of FIG. 6, the total rotation angle of each of the two linear polarized light beams is 90 degrees clockwise, e.g., viewing along −Z direction, and the beam enters the output optical fiber 20 for outputting. In other examples, the total rotation angle of each of the two linear polarized light beams may be 90 degrees counterclockwise, e.g., viewing along −Z direction, and the beam enters the corresponding output optical fiber for outputting. Altering the rotation of the rotation devices and rotator can readily achieve this.

Figure 9:
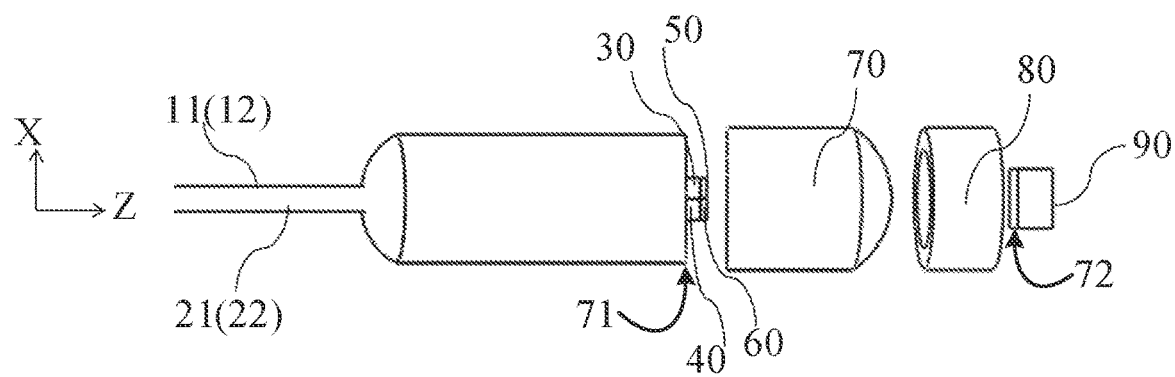
FIG. 9 illustrates a side view on an X-Z plane of another optical isolator having optical fibers arranged on a single side according to various embodiments of the present disclosure.
Figure 10:
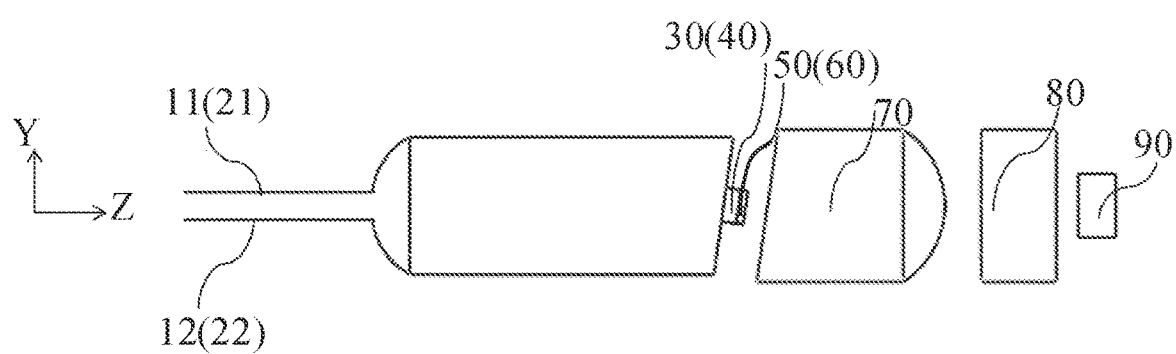
FIG. 10 illustrates another side view on an Y-Z plane of the optical isolator of FIG. 9 having the optical fibers arranged on the single side according to various embodiments of the present disclosure.

As shown FIGS. 9 to 10, in some embodiments, an optical isolator 200 of the present disclosure includes an input having more than one input optical fiber 11, 12 and includes an output having more than one output optical fiber 21, 22. Other features of this isolator 200 can be similar to the isolator 100 disclosed above. This isolator 200 includes an input splitting/combining device 30, an output splitting/combining device 40, an input optical rotation device 50, an output optical rotation device 60, a lens 70, an intermediate rotation device (i.e., Faraday rotator) 80, and a reflector 90 that are sequentially arranged. End surfaces of the input optical fiber 11, the input optical fiber 12, the output optical fiber 21, and the output optical fiber 22 are located in the same plane. The input splitting/combining device 30 is fixed on the input optical fiber 11 and the input optical fiber 12, and the input optical rotation device 50 is fixed on the input splitting/combining device 30.

There are two focal planes on the outer side of the lens 70. End surfaces of the input optical fiber 11, the input optical fiber 12, the output optical fiber 21, and the output optical fiber 22 are located on a first focal plane 71 of the lens 70.

The reflecting face of the reflector 90 is located on a second focal plane of the lens 7. The Faraday rotator 80 is located between the lens 70 and the reflector 90. The output splitting/combining device 40 is fixed on the output optical fiber 21 and the output optical fiber 22, and the output optical rotation device 60 is fixed on the output splitting/combining device 40.

As shown in FIGS. 11A and 11B, in some embodiments, the input optical fiber 11 (x1, y1), the input optical fiber 12 (x1, −y1), the output optical fiber 21 (−x1, −y1), and the output optical fiber 22 (−x1, y1) are combined into a four-optical-fiber head (FOFH). The input optical fiber 11 (x1, y1) and the output optical fiber 21 (−x1, −y1) are symmetrically distributed or arranged with respect to an axis of the FOFH. The input optical fiber 12 (x1, −y1) and the output optical fiber 22 (−x1, y1) are symmetrically distributed or arranged with respect to an axis of the FOFH. The number of the input optical fibers is two, and the number of the output optical fibers is two. Accordingly, the optical isolator 200 can function for two inputs and two outputs.

As shown in FIGS. 11A-11B, in some embodiments, the input splitting/combining device 30 and the output splitting/combining device 40 may include, for example, a YVO4 crystal. In some examples, the input splitting/combining device 30 and the output splitting/combining device 40 may be mutually independent and may be used for splitting/combining the o light and the e light inside the crystal. An optical axis 31 of the input splitting/combining device 30 and an optical axis 41 of the output splitting/combining device 40 may have the same direction, and the optical axes (31, 41) may intersect obliquely with a surface of the crystal at an angle of 45 degrees. The splitting direction of the o light and the e light is perpendicular to the beam propagation direction (the Z direction) and is parallel to the direction of relative displacement (the X direction) between the input optical fiber 10 and the output optical fiber 20 That is, the splitting direction of the o light and the e light is in the X direction.

As shown in FIGS. 11A and 11B, in some embodiments, the input optical rotation device 50 and the output optical rotation device 60 may include a half-wave plate used for rotating a polarization direction of a linear polarized light. An angle between the optical axis 51 of the input optical rotation device 50 and the X axis is 0 degree, and the rotation angle of a linear polarized light in the X-Y plane is 0 degree in polarization directions, such as the X direction, the Y direction, and the 45-degree direction. The angle between the optical axis 61 of the output optical rotation device 60 and the X axis is 22.5 degrees, and the rotation angle of a linear polarized light in the X-Y plane is 45 degrees in polarization directions, such as the X direction, the Y direction, and the 45-degree direction.

As shown in FIGS. 9 to 11, the lens 70 may be a C lens, and may have two focal planes, e.g., front (first) and back (second) focal planes 71, 72.

The Faraday rotator 80 for the isolator 200 can be similar to that shown in FIG. 5, in some embodiments, the Faraday rotator 80 includes a magneto-optical crystal 81 and a magnetic field device 82. The magnetic field device 82 may be, for example, a hollow magnetic ring used for providing a saturated magnetic field strength for the magneto-optical crystal 82, causing the magneto-optical crystal 82 to perform a rotation of the polarization direction of the linear polarized light in the X-Y plane with the rotation angle at 22.5 degrees. The magnetic field direction is parallel to the light propagation direction. That is, the magnetic field direction is in or parallel to the +/−Z direction. When the linear polarized light incomes from the N pole 83 of the magnetic field, the polarization direction may be rotated clockwise, e.g., viewing along −Z direction or a direction opposite the light propagation direction.

As shown in FIG. 12, the isolator 200 allows incident light of an optical beam in a forward light path at the inputs 11, 12 to pass for output at the output 21, 22. The forward light path in the X-Z plane in this embodiment is as follows. Two incident light beams are inputted, respectively, from the input optical fiber 11 (x=x1, z=z0) and the input optical fiber 12 (x=x1, z=z0) along the Z direction. The light beams pass the input splitting/combining device 30 to cause the splitting of the o light and the e light in the crystal. That is, each incident beam is split into two linear polarized light beams, having a first linear polarized light beam polarized in a direction in X-Z plane indicated by a double-headed arrow, e.g., e light beam, and a second linear polarized light beam polarized in the Y direction indicated by a dot, e.g. o light beam. The beams enter the input optical rotation device 50, and the polarization directions of the four linear polarized light beams are rotated clockwise by 0 degree, i.e., being not rotated by the input optical rotation device 50, e.g., viewing along −Z direction.

From the rotation device 50, the polarized beams enter the lens 70, where beam collimation and focusing are performed. From the rotation device 50, beams pass the magneto-optical crystal 81 in the Faraday rotator 80, the polarization directions of the four linear polarized light beams are rotated clockwise by 22.5 degrees, e.g., viewing along −Z direction. Further, the beams are focused onto the reflection surface 91 of the reflector 90. The beams are reflected by the reflection surface 91 and return to or reach the magneto-optical crystal 81 in the Faraday rotator 80, and, accordingly, the polarization directions of the four linear polarized light beams are then rotated clockwise by an amount of 22.5 degrees, e.g., viewing along −Z direction. Passing from the rotator 80, the polarized beams enter the output optical rotation device 60, and the polarization directions of the four linear polarized light beams are rotated clockwise by 45 degrees, e.g., viewing along −Z direction. At this point, the total rotation angle of each of the four linear polarized light beams is 90 degrees clockwise, e.g., viewing along −Z direction, and the beams can be combined by entering the output splitting/combining device 40. Accordingly, two emitting beams corresponding to the two incident beams are formed; and the two emitting beams respectively enter the output optical fiber 21 (x=−x1, z=z0) and the output optical fiber 22 (x=−x1, z=z0) for outputting.

Figure 13:
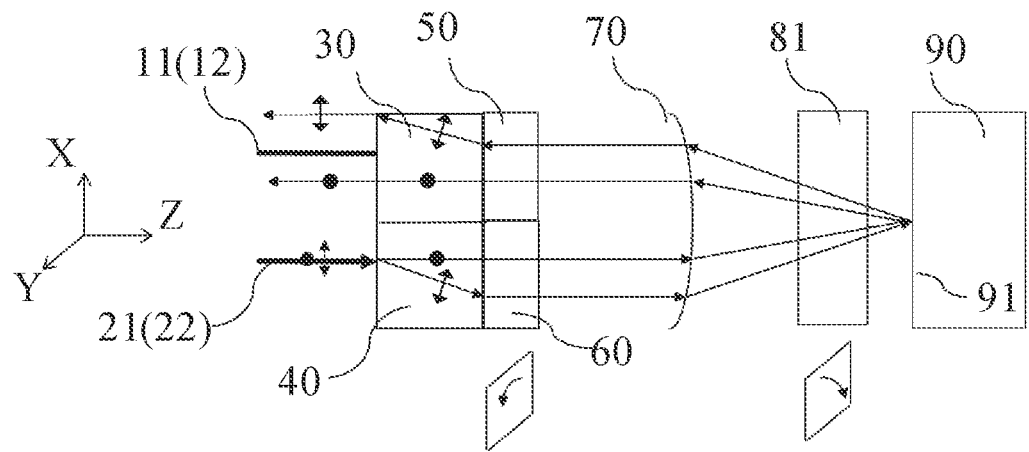
FIG. 13 illustrates another X-Z plane schematic diagram of the optical isolator of FIG. 9 showing an example backward light path according to various embodiments of the present disclosure.

In contrast to the forward light path of FIG. 12, the isolator 200 as shown in FIG. 13 isolates incident light of an optical beam at the output 20 from being output in a backward light path to the input 10. The backward isolation light path in the x-z plane in this embodiment is as follows. Two incident beams input from the output optical fiber 21 (x=−x1, z=z0) and the output optical fiber 22 (x=−x1, z=z0) along the Z direction can pass to the output splitting/combining device 40, which splits the o light and the e light in the crystal of the output splitting/combining device 40. That is, each incident beam is split into two linear polarized light beams, having a first linear polarized light beam polarized in a direction in X-Z plane and indicated by a double-headed arrow and a second linear polarized light beam polarized in the Y direction indicated by a dot.

From the splitting/combining device 40, the beams enter the output optical rotation device 60, and the polarization directions of the four linear polarized light beams are rotated counterclockwise by 45 degrees, e.g., viewing along −Z direction. From the rotating device 60, the beams enter the lens 70, where beam collimation and focusing are performed. As the beams pass the magneto-optical crystal 81 in the Faraday rotator 80, the polarization directions of the four linear polarized light beams are rotated clockwise by 22.5 degrees, e.g., viewing along −Z direction. The polarized beams are focused onto the reflection surface 91 of the reflector 90. The beams are reflected by the reflection surface 91 and return to or reach the magneto-optical crystal 81 in the Faraday rotator 80, and, accordingly, the polarization directions of the four linear polarized light beams are rotated clockwise by 22.5 degrees, e.g., viewing along −Z direction. Further, the beams enter the input optical rotation device 50, and the polarization directions of the four linear polarized light beams are rotated clockwise by 0 degree, i.e., not being rotated by the input optical rotation device 50, e.g., viewing along −Z direction. At this point, the total rotation angle of each of the four linear polarized light beams is 0 degree. Therefore, the beams are not combined after further entering the input splitting/combining device 30. Instead, the input splitting/combining device 30 further displaces the e-light relative to the o-light. Accordingly, the input optical fiber 11 (x=x1, z=z0) and the input optical fiber 12 (x=x1, z=z0) have no light beam to output.

Figure 14:
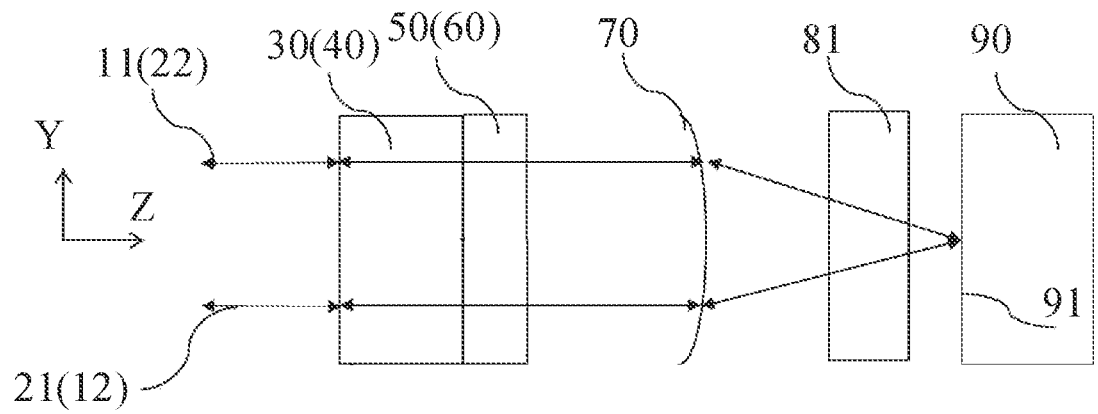
FIG. 14 illustrates an Y-Z plane schematic diagram of the optical isolator of FIG. 9 showing an example light path according to various embodiments of the present disclosure.

In the examples of FIG. 14, there is no beam splitting/combining in the Y-Z plane. Light incoming from the input optical fiber 11 (y=y1, z=z0) and being focused by the lens 70 and reflected by the reflector 90 enters the output optical fiber 21 (y=−y1, z=zo) for outputting. Meanwhile, light incoming from the input optical fiber 22 (y=y1, z=z0) and being focused by the lens 70 and reflected by the reflector 90, enters the output optical fiber 12 (y=−y1, z=z0).

In the examples of FIGS. 4A and FIG. 11A, the optical axis 41 of the output splitting/combining device 40 may be parallel to the optical axis 31 of the input splitting/combining device 30. In other examples, the optical axis 41 of the output splitting/combining device 40 may be changed and may be perpendicular to the optical axis 31 of the input splitting/combining device 30; and the one or more output optical fibers may have one or more locations changed along X direction, such that an optical isolator of the present disclosure can still operate as a non-reciprocal device only allowing one-way transmission of light.

Figure 15:
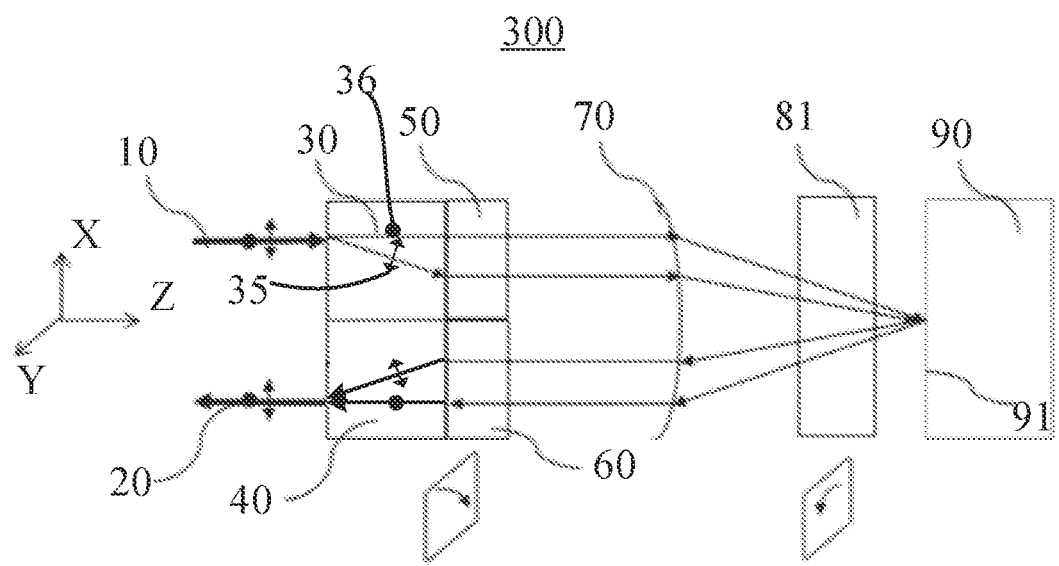
FIG. 15 illustrates an X-Z plane schematic diagram of yet another example optical isolator showing an example forward light path according to various embodiments of the present disclosure.
Figure 16:
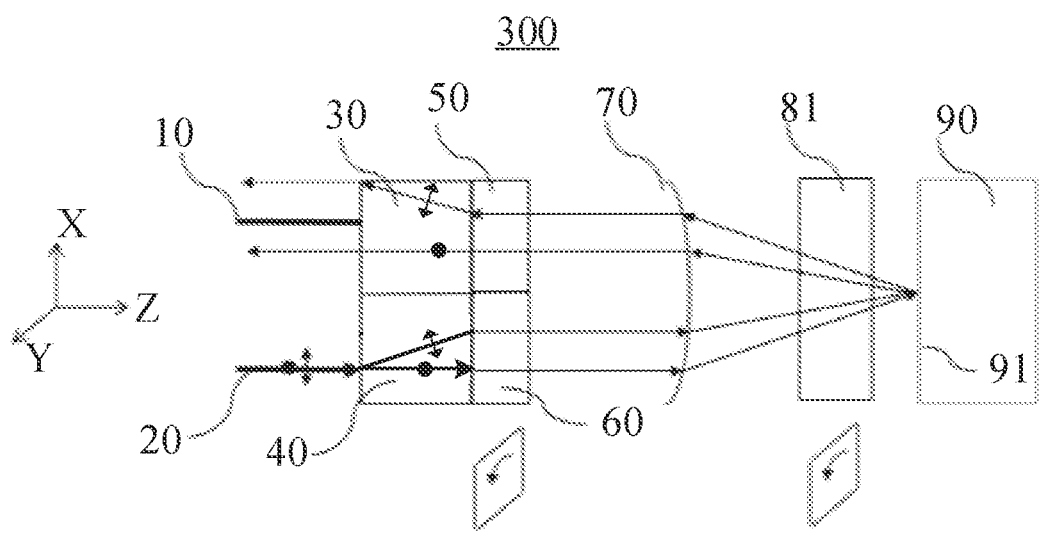
FIG. 16 illustrates another X-Z plane schematic diagram of the optical isolator of FIG. 15 showing an example backward light path according to various embodiments of the present disclosure.

FIGS. 15-16 show one such example of an isolator 300. In this example, the output optical fiber 20 can be changed from the previous location (x=−x0, z=z0) in FIGS. 6 and 7 to another location (x=−x1, z=z0) in FIGS. 15 and 16 along X direction for outputting. For this configuration, the location value x1 can be given by x1=x0+c1, and c1 is the amount of change between x1 and x0. The optical axis (41) of the output splitting-combining device 40 has a different orientation. In particular, the optical axis 41 may be in or parallel to the surface 42 of the crystal of the device 40 and can be perpendicular to the optical axis (31) of the input device 40. The angle (A41) between the optical axis 41 and the edge (43) (e.g., along +X direction) of the surface (42) of the crystal of the device 40 may be 135 degrees. Thus, the birefringence of the output splitting-combining device 40 in FIGS. 15-16 is opposite to that of FIGS. 6-7. While, the configuration of the input-splitting device 30 is the same for both configurations in FIGS. 6-7 and 15-16.

Nevertheless, the isolator 300 allows incident light of an optical beam in a forward light path at the input 10 to pass for output at the output 20, but isolates incident light in a backward light path. As shown in FIG. 15, the forward light path in the X-Z plane is as follows. An incident light beam is input from the input optical fiber 10 (x=x0, z=z0) along the Z direction. The light beam passes the input splitting/combining device 30 to cause the splitting of the o light and the e light in the crystal of the input splitting/combining device 30. That is, one incident beam is split into two linear polarized light beams, having a first linear polarized light beam, e light, polarized in a direction in X-Z plane and perpendicular to the light propagation direction indicated by a double-headed arrow 35, and a second linear polarized light beam, o light, polarized in the Y direction indicated by a dot 36. The beams enter the input optical rotation device 50, and the polarization directions of the two linear polarized light beams are rotated clockwise by 0 degree, i.e., being not rotated by the input optical rotation device 50, e.g., viewing along −Z direction.

From the rotation device 50, the beams enter the lens 70, where beam collimation and focusing are performed. As the beams pass the magneto-optical crystal 81 in the Faraday rotator 80 (from an S pole), the polarization directions of the two linear polarized light beams are rotated counter-clockwise by 22.5 degrees, e.g., viewing along −Z direction. Passing from the rotator 80, the beams are focused onto the reflection surface 91 of the reflector 90. In the example of FIG. 15, the Faraday rotator 80 can be oriented or configured, such that as the beams pass the magneto-optical crystal 81 from the lens 70, the beams pass the magneto-optical crystal 81 from an S pole.

At the reflector 90, the beams are reflected by the reflection surface 91 and return to or reach the magneto-optical crystal 81 in the Faraday rotator 80, and, accordingly, the polarization directions of the two linear polarized light beams are rotated counter-clockwise by 22.5 degrees, e.g., viewing along −Z direction. Passing from the rotator 80, the beams enter the output optical rotation device 60, and the polarization directions of the two linear polarized light beams are rotated clockwise by 45 degrees, e.g., viewing along −Z direction. At this point, the total rotation angle of each of the two linear polarized light beams is 0 degrees clockwise, e.g., viewing along −Z direction. Therefore, the beams can be combined by further entering the output splitting/combining device 40. In the example of FIG. 15, as the optical axis 41 of the output splitting/combining device 40 is perpendicular to the optical axis 31 of the input splitting/combining device 30, the beam enters the output optical fiber 20 at the location (x=−x1, z=z0) for outputting.

In contrast to the forward light path of FIG. 15, the isolator 300 as shown in FIG. 16 isolates incident light of an optical beam in a backward light path at the output 20 from being output at the input 10. The backward isolation light path in the X-Z plane is as follows. An incident light beam is input from the output optical fiber 20 (x=−x1, z=z0) along the Z direction. The light beam passes the output splitting/combining device 40, which splits of the o light and the e light in the crystal of the output splitting/combining device 40. That is, one incident beam is split into two linear polarized light beams, having a first linear polarized light beam, e light, polarized in a direction perpendicular to the light propagation direction and in X-Z plane, as indicated by a double-headed arrow, and a second linear polarized light beam, o light polarized in the Y direction indicated by a dot, in the crystal of the output splitting/combining device 40.

From the splitting/combining device 40, the beams enter the output optical rotation device 60, and the polarization directions of the two linear polarized light beams are rotated counterclockwise by 45 degrees, e.g., viewing along −Z direction. From the rotating device 60, the beams enter the lens 70, and beam collimation and focusing are performed. As the beams pass the magneto-optical crystal 81 in the Faraday rotator 80, the polarization directions of the two linear polarized light beams are rotated counterclockwise by 22.5 degrees, e.g., viewing along −Z direction.

At the reflector 90, the beams are focused onto the reflection surface 91 of the reflector 90. The beams are reflected by the reflection surface 91 and return to the magneto-optical crystal 81 in the Faraday rotator 80, and, accordingly, the polarization directions of the two linear polarized light beams are rotated counterclockwise by 22.5 degrees, e.g., viewing along −Z direction. Further, the beams enter the input optical rotation device 50, and the polarization directions of the two linear polarized light beams are rotated clockwise by 0 degree, i.e., not being rotated by the input optical rotation device 50, e.g., viewing along −Z direction. At this point, the total rotation angle of each of the two linear polarized light beams is 90 degree. Therefore, the beams are not combined after further entering the input splitting/combining device 30. Instead, the input splitting/combining device 30 further displaces the e-light relative to the o-light. Accordingly, the input optical fiber 10 (x=x0, z=z0) has no light beam to output.

The present invention provides an optical isolator used in the field of optical communications, with optical fibers arranged on one single side. The optical isolator with optical fibers arranged on one single side may include an input optical fiber, an output optical fiber, an input splitting/combining device, an output splitting/combining device, an input optical rotation device, an output optical rotation device, a lens, a Faraday rotator, and a reflector. A scheme of a light path having a reflector is adopted in the present disclosure, and accordingly, the optical isolator with optical fibers arranged on one single side only needs to use one collimator, and the input and the output are on the same side of the device. Thus, smaller size, lower cost, and simpler assembly process thereof may be obtained in an optical isolator consistent with the present disclosure, as compared to optical isolators that have optical fibers arranged on two sides. Further, the splitting/combining devices may be fixed on end surfaces of an input/output optical fibers, the volume of splitting/combining devices required by the optical isolator with optical fibers arranged on a single side may be reduced, and a more compact structure and lower material cost may be obtained.

It should be noted that variations and modifications to the embodiments disclosed herein are possible. Those of ordinary skills in the art should be aware that various modifications made to the form and details of the present disclosure without departing from the spirit and range of the present disclosure shall all fall within the protection scope of the present invention.

The present disclosure may be embodied in other specific forms without departing from its spirit or essential characteristics. The described embodiments are to be considered in all respects only as illustrative and not restrictive.

What is claimed is:

1. An optical isolator device for one-way transmission of an optical beam between at least one input fiber and at least one output fiber, the isolator comprising:
   an input birefringent device disposed in optical communication with the at least one input fiber;
   an input rotation device disposed in optical communication with the input birefringent device;
   an output birefringent device disposed adjacent the input birefringent device and disposed in optical communication with the at least one output fiber;
   an output rotation device disposed in optical communication with the output birefringent device;
   an intermediate rotation device disposed in optical communication with the input and output rotation devices;
   a lens disposed in optical communication between the intermediate rotation device and the input and output rotation devices; and
   a reflector disposed in optical communication with the intermediate rotation device and configured to reflect the optical beam incident thereto.

2. The device of claim 1, wherein each of the input and output birefringent devices comprises a displacement-type birefringent crystal configured to displace extraordinary light (e-light) relative to ordinary light (o-light) of the optical beam incident thereto.

3. The device of claim 1, wherein each of the input and output rotation devices comprises a ½ wavelength (λ) phase delay-type crystalline quartz waveplate configured to rotate a polarization direction of linear polarized light of the optical beam incident thereto.

4. The device of claim 1, comprising a dual-fiber head having the at least one input fiber and the at least one output fiber disposed therein symmetric with respect to a central axis of the dual-fiber head.

5. The device of claim 1, wherein:
   the input birefringent device is fixed on an end face of the at least one input fiber; and
   the output birefringent device is fixed on an end face of the at least one output fiber.

6. The device of claim 1, wherein:
   the input rotation device is fixed on the input birefringent device; and
   the output rotation device is fixed on the output birefringent device.

7. The device of claim 1, wherein a combination of the input rotation device and the output rotation device is configured to rotate a polarization direction of one or more optical beams received from the at least one input fiber by 90 degrees.

8. The device of claim 1, wherein the lens comprises:
   a first focus plane on a first side of the lens; and
   a second focus plane on a second side of the lens,
   wherein the first focus plane of the lens is disposed at end faces of the at least one input and output fibers.

9. The device of claim 1, wherein:
   the input birefringent device is configured to split first and second polarized light beams from incident light of the optical beam received from the at least one input fiber;
   a combination of the input rotation device, the intermediate rotation device, and the output rotation device is configured to rotate a polarization direction of each of the first and second polarized light beams by 90 degrees; and
   the output birefringent device is configured to combine the first and second polarized light beams incident thereto from the output rotation device into output light for the at least one output fiber.

10. The device of claim 9, wherein:
    the input rotation device is configured to rotate the polarization direction of each of the first and second polarized light beams by zero degree;
    the intermediate rotation device is configured to rotate the polarization direction of each of the first and second polarized light beams by 45 degrees in a first rotation; and
    the output rotation device is configured to rotate the polarization direction of each of the first and second polarized light beams by 45 degrees in the first rotation.

11. The device of claim 10, wherein the intermediate rotation device is configured to rotate the polarization direction of each of the first and second polarized light beams incident thereto in a prorogation direction from the input by 22.5 degrees in the first rotation and is configurated to rotate the polarization direction of each of the first and second polarized light beams incident therefrom in a reflected direction from the reflector by 22.5 degrees in the first rotation.

12. The device of claim 9, wherein a splitting direction of the first and second polarized light beams is perpendicular to a beam propagation direction of the incident light beam and is parallel to a direction of relative displacement between the at least one input output fibers.

13. The device of claim 1, wherein:
the output birefringent device is configured to split first and second polarized light beams from any incident light of the optical beam received from the at least one output fiber;
a combination of the output optical rotation device, the intermediate rotation device, and the input rotation device is configured to rotate a polarization direction of each of the first and second polarized light beams by zero degree; and
the input birefringent device is configured to split the first and second polarized light beams incident thereto from the input rotation device further in isolation from the at least one input fiber.

14. The device of claim 13, wherein:
the output rotation device is configured to rotate the polarization direction of each of the first and second polarized light beams by 45 degrees in a first rotation;
the intermediate rotation device is configured to rotate the polarization direction of each of the first and second polarized light beams by 45 degrees in a second rotation opposite the first rotation; and
the input rotation device is configured to rotate the polarization direction of each of the first and second polarized light beams by zero degree.

15. The device of claim 1, wherein:
the input birefringent device includes a birefringent crystal having a first optical axis;
the output birefringent device includes a birefringent crystal having a second optical axis;
the second optical axis is parallel or orthogonal to the first optical axis, and
an angle between the first optical axis and an edge of the birefringent crystal of the input birefringent device is 45 degrees.

16. The device of claim 1, wherein the intermediate rotation device comprises:
a Faraday rotator having a magneto-optical crystal; and
a magnetic ring disposed at least partially enclosing the magneto-optical crystal.

17. The device of claim 16, wherein the magneto-optical crystal has a rotation angle of 22.5-degrees for a polarization direction of linear polarized light; and wherein the magnetic ring comprises a permanent magnet configured to provide a saturated magnetic field strength of the magneto-optical crystals, causing the magneto-optical crystals to have fixed rotation of a polarization direction of linear polarized light.

18. An optical isolator device for one-way transmission of light between input fibers and output fibers, the isolator comprising:
a first side of the optical isolator device for the input fibers and output fibers;
a second side of the optical isolator device opposite to the first side;
an input splitting-combining device disposed at the first side of the optical isolator device and disposed in optical communication with the input optical fibers;
an input optical rotation device disposed between the input splitting-combining device and the second side and disposed in optical communication with the input splitting-combining device;
a lens disposed between the input optical rotation device and the second side and disposed in optical communication with the input optical rotation device;
a rotator disposed between the lens and the second side and disposed in optical communication with the lens, the rotator configured to rotate a polarization direction of a light beam;
a reflector disposed at the second side of the optical isolator device and configured to receive one or more light beams from the rotator and reflect the one or more light beams to the rotator;
an output optical rotation device disposed between the rotator and the lens and disposed in optical communication with the lens; and
an output splitting-combining device disposed in optical communication between the output optical rotation device and the output fibers at the first side of the optical isolator device.

19. The device of claim 18, wherein:
the input splitting-combining device is configured to split first incident light beam from a first of the input fibers into a first light beam and a second light beam, and split a second incident light beam from a second of the input fibers into a third light beam and a fourth light beam;
a combination of the input optical rotation device, the rotator, and the output optical rotation device is configured to rotate a polarization direction of each of the first, second, third, and fourth light beams by 90 degrees;
the output splitting-combining device is configured to combine the first and second light beams into a first output light beam for a first of the output fiber and combine the third and fourth light beams into a second output light beam for a second of the output fibers.

20. The device of claim 19, wherein:
the input optical rotation device is configured to rotate the polarization direction of each of the first, second, third, and fourth light beams by zero degrees;
the rotator is configured to rotate the polarization direction of each of the first, second, third, and fourth light beams by 45 degrees in a first rotation direction; and
the output optical rotation device is configured to rotate the polarization direction of each of the first, second, third, and fourth light beams by 45 degrees in the first rotation direction.

21. The device of claim 20, wherein:
the output splitting-combining device is configured to split any first incident light beam from a first of the output fibers into a first light beam and a second light beam, and split any second incident light beam from a second of the output fibers into a third light beam and a fourth light beam;
a combination of the output optical rotation device, the rotator, and the input optical rotation device is configured to rotate a polarization direction of each of the first, second, third, and fourth light beams by zero degree;

the input splitting-combining device is configured to further separate the first light beam from the second light beam for isolation from a first of the input fiber and further separate the third light beam from the fourth light beam for isolation from a second of the input fibers.

22. The device of claim 21, wherein:

the output optical rotation device is configured to rotate the polarization direction of each of the first, second, third, and fourth light beams by 45 degrees in a first rotation direction;

the rotator is configured to rotate the polarization direction of each of the first, second, third, and fourth light beams by 45 degrees in a second rotation direction opposite the first rotation direction; and the input optical rotation device is configured to rotate the polarization direction of each of the first and second light beams by zero degree.

* * * * *